United States Patent
Chen et al.

(10) Patent No.: US 12,290,923 B2
(45) Date of Patent: May 6, 2025

(54) BIPED ROBOT AND MULTI-CONFIGURATION ROBOT CAPABLE OF BEING SPLICED AUTONOMOUSLY, AND CONTROL METHOD OF MULTI-CONFIGURATION ROBOT

(71) Applicant: Shandong University, Jinan (CN)

(72) Inventors: Teng Chen, Jinan (CN); Xuewen Rong, Jinan (CN); Yibin Li, Jinan (CN); Guoteng Zhang, Jinan (CN); Guanglin Lu, Jinan (CN); Jian Bi, Jinan (CN)

(73) Assignee: Shandong University, Jinan (CN)

( * ) Notice: Subject to any disclaimer, the term of this patent is extended or adjusted under 35 U.S.C. 154(b) by 439 days.

(21) Appl. No.: 17/951,557

(22) Filed: Sep. 23, 2022

(65) Prior Publication Data
US 2023/0099337 A1 Mar. 30, 2023

(30) Foreign Application Priority Data
Sep. 26, 2021 (CN) .......................... 202111129572.6

(51) Int. Cl.
| | |
|---|---|
| H02M 5/275 | (2006.01) |
| B25J 9/00 | (2006.01) |
| B25J 9/08 | (2006.01) |
| B25J 17/00 | (2006.01) |
| B62D 57/032 | (2006.01) |
| H02M 1/08 | (2006.01) |

(52) U.S. Cl.
CPC ............... *B25J 9/08* (2013.01); *B25J 9/0009* (2013.01); *B25J 17/00* (2013.01); *B62D 57/032* (2013.01)

(58) Field of Classification Search
CPC ...... B60L 53/14; B60L 13/003; B60L 13/006; B60L 13/03; B60L 13/04; B60L 13/06; B60L 13/10; B60L 2200/26; B60L 2200/36; B60L 7/18
See application file for complete search history.

(56) References Cited

U.S. PATENT DOCUMENTS

| | | | | |
|---|---|---|---|---|
| 2019/0369641 A1* | 12/2019 | Gillett | ................. | G05D 1/0212 |
| 2019/0382250 A1* | 12/2019 | Zhang | ................... | B25J 19/027 |

* cited by examiner

*Primary Examiner* — Kawing Chan
*Assistant Examiner* — Charles S Laughlin

(57) ABSTRACT

Disclosed is a biped robot and multi-configuration robot capable of being spliced autonomously, and a control method of the multi-configuration robot. The biped robot comprises a torso, arms, legs, a tolerance docking sleeve, and a torso docking device. The arms are correspondingly arranged at the left and right sides of the torso, and two legs are arranged at the lower side of the torso. The tolerance docking sleeve is movably arranged at the rear side of the torso through a base, and the torso docking device is fixed to the front side of the torso. Single biped robots in the present disclosure can form a multi-configuration legged combined body in a self-organization and reconstruction mode so as to achieve bipedal, quadrupedal, hexapodal and other multi-legged configurations. The motion stability and the load capacity of the legged robot are improved through the splicing combination of the modular legged robots.

17 Claims, 8 Drawing Sheets

BIPED ROBOT AND MULTI-CONFIGURATION ROBOT CAPABLE OF BEING SPLICED AUTONOMOUSLY, AND CONTROL METHOD OF MULTI-CONFIGURATION ROBOT

CROSS-REFERENCE TO RELATED APPLICATION

This patent application claims the benefit of and takes priority from Chinese Patent Application No. 202111129572.6, filed with the China National Intellectual Property Administration on Sep. 26, 2021, the disclosure of which is incorporated by reference herein in its entirety as part of the present application.

TECHNICAL FIELD

The present disclosure belongs to the technical field of legged mobile robots, and in particular relates to a biped robot and multi-configuration robot capable of being spliced autonomously, and a control method of the multi-configuration robot.

BACKGROUND

Traditional wheeled and tracked mobile robots cannot meet the demand for high trafficability of unstructured terrains, while mammal-imitated legged robots have natural advantages in the aspect of adaptability to complex terrains with the characteristic of discrete footholds. Legged robots are mainly biped and quadruped robots. At present, the quadruped robots can achieve excellent robust motion capacity, but the motion capacity of a single robot is limited, and the motion capacity under the strong unstructured terrain, the strong chaotic uneven terrain and the discontinuous terrain is insufficient. Biped robots have developed rapidly in recent years, but most of the biped robots still face huge challenges in stability except for a few robots such as ATLAS of Boston Dynamics.

The inventor of the present disclosure has discovered that a current single legged robot has the problems of limited load capacity, insufficient motion robustness, poor operation capacity and the like.

SUMMARY

To solve the problem above, the present disclosure provides a biped robot and multi-configuration robot capable of being spliced autonomously, and a control method of the multi-configuration robot. The single biped robots in the present disclosure can form a multi-configuration legged combined body in a self-organization and reconfiguration mode so as to achieve bipedal, quadrupedal, hexapodal and other multi-legged configurations. The motion stability and the load capacity of the legged robot are improved through modular assembling of the legged robot, and the movement and operation such as strong complex-terrain motion and cooperative handling can be achieved.

To achieve the objective, in a first aspect, the present disclosure provides a biped robot capable of being spliced autonomously, which comprises a torso, arms, legs, a tolerance docking sleeve, and a torso docking device.

The arms are correspondingly arranged on the left and right sides of the torso, and two legs are arranged on the lower side of the torso.

The tolerance docking sleeve is movably arranged on the rear side of the torso through a base, and the torso docking device is fixed to the front side of the torso.

Further, the base comprises a base body, a pitching motion link, and a rolling motion link. The base body is provided with a connecting space, and in the connecting space, the base body is connected to the pitching motion link by a pitch torsion spring, and the pitching motion link is connected to the rolling motion link by a rolling torsion spring.

Further, the tolerance docking sleeve comprises a tolerance guide sleeve connected to one end, away from the base, of the rolling motion link, a docking sleeve cap connected to the tolerance guide sleeve, and an electromagnet arranged in the tolerance guide sleeve.

Further, the tolerance guide sleeve is provided with a conical accommodation space, the end, away from the torso, of the torso docking device is provided to be conical, and the conical size corresponds to the size of the conical accommodation space of the tolerance guide sleeve; and a docking iron sheet is arranged at the top end of the torso docking device.

Further, the legs each are provided with a thigh link and a shank link. First leg rotating parts are correspondingly fixed to the two ends of the lower side of the torso, second leg rotating parts are perpendicularly fixed to the first leg rotating parts and are connected to the thigh links, and third leg rotating parts are fixed to the thigh links and are connected to the shank links by links.

Further, the arms each are provided with an upper arm link and a forearm link. Upper arm rotating parts are respectively fixed to both sides of the torso by steel wire traction torsion springs, and are connected to the upper arm links; and forearm rotating parts are fixed to the upper arm links, and the forearm rotating parts are connected to the forearm links by drive links.

Further, an arm traction motor is fixed into the torso, a steel wire is wound around an output shaft of the arm traction motor, and both ends of the steel wire are fixed to the steel wire traction torsion springs on both sides of the torso.

To achieve the objective, in a second aspect, the present disclosure further provides a multi-configuration robot capable of being spliced autonomously. The multi-configuration robot comprises a plurality of biped robots capable of being spliced autonomously according to the first aspect, where two adjacent biped robots capable of being spliced autonomously are connected by the tolerance docking sleeve and the torso docking device.

Further, a controllable electromagnet is installed at the tail end of the arm, and the arms of two adjacent biped robots capable of being spliced autonomously are connected by the controllable electromagnets.

To achieve the objective, in a third aspect, the present disclosure further provides a control method of a multi-configuration robot. The method comprises the following steps:

energizing the electromagnet in tolerance guide sleeve, and inserting the torso docking device into the conical accommodation space on the tolerance guide sleeve;

adsorbing, by the electromagnet in the tolerance guide sleeve, the docking iron sheet at the top end of the torso docking device, and enabling the conical accommodation space to be in fit with the conical structure on the torso docking device to achieve tolerance docking; and energizing the controllable electromagnets on the arms, and connecting, by the controllable electromagnets, the arms of the two adjacent biped robots capable of being spliced autonomously.

Compared with the prior art, the present disclosure has the beneficial effects that:

1. In accordance with the present disclosure, a plurality of modular biped robots may be autonomously spliced according to robot tasks and terrains so as to achieve the multi-configuration mobile operation.

2. The single robot in accordance with the present disclosure has the ability of stable gait motion in the three-dimensional space, and the arm part has the ability of performing simple operation.

3. The plurality of single robots may form quadrupedal, hexapodal and multi-legged modes through a handshake type splicing combination mode and a shaft-hub type splicing combination mode, such that the variety of motion gait of the robot combined body is increased, and the motion stability is significantly improved compared to single units, and stable motion in strongly chaotic terrain.

4. The legged robot combined body formed by splicing may achieve a variety of operations such as grabbing and handling by multi-arm collaboration, the load capacity of the combined body is increased, and large load operations may be achieved.

BRIEF DESCRIPTION OF THE DRAWINGS

The accompanying drawings, which constitute a part of the present embodiment, serve to provide a further understanding of the present embodiment, and illustrative embodiments thereof serve to explain the present embodiment and do not constitute an undue limitation of the present embodiment.

Figure 1:
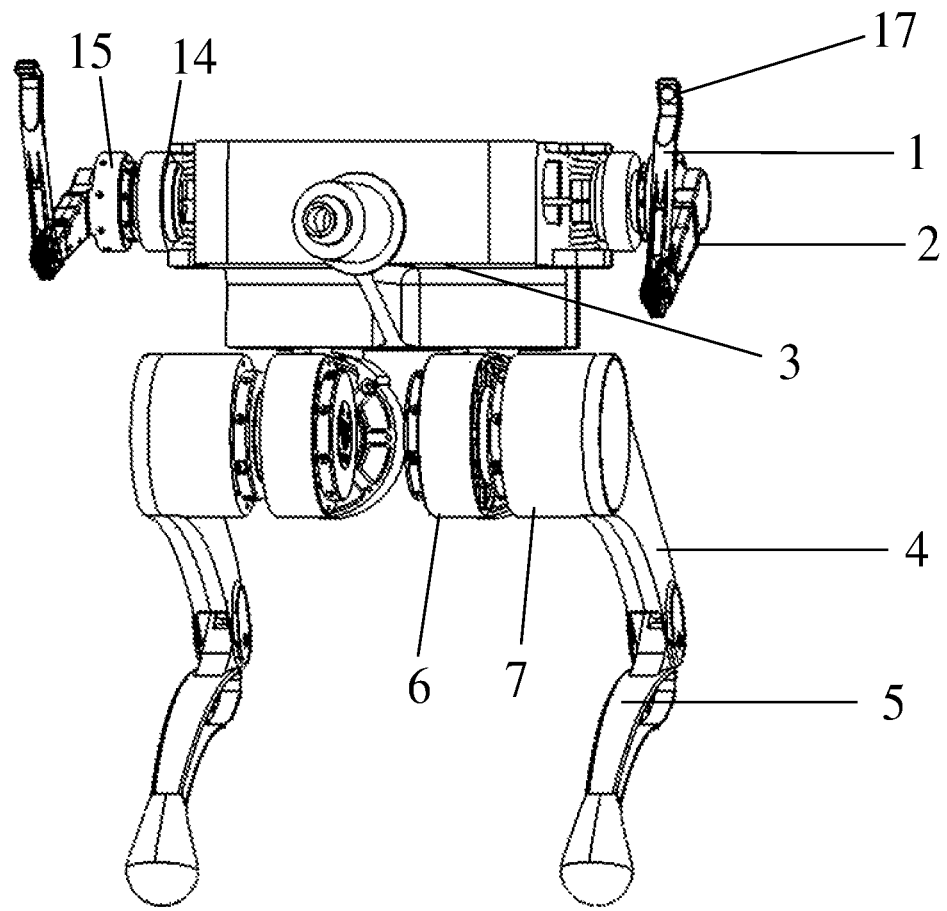
FIG. 1 is a schematic diagram of an overall structure of the front face of a modular biped robot capable of being spliced autonomously according to the embodiment 1 of the present disclosure.

In the drawings: 1—forearm link, 2—upper arm link; 3—torso; 4—thigh link; 5—shank link; 6—second leg motor; 7—third leg motor; 8—first leg motor; 9—base; 91—base body; 92—pitching motion link; 93—rolling motion link; 94—pitching torsion spring; 95—rolling torsion spring; 10—tolerance docking sleeve; 101—docking sleeve cap; 102—tolerance guide sleeve; 11—torso docking device; 12—steel wire, 13—arm traction motor; 14—upper arm motor; 15—forearm motor; 16—docking iron sheet; 17—electromagnet; 18—steel wire traction torsion spring.

DETAILED DESCRIPTION OF THE EMBODIMENTS

The following further describes the present disclosure with reference to the accompanying drawings and embodiments.

It should be noted that the following detailed descriptions are all illustrative and intended to provide a further description of the present disclosure. Unless otherwise specified, all technical and scientific terms used herein have the same meaning as commonly understood by those of ordinary skill in the art to which the present disclosure belongs.

Embodiment 1

As shown in FIG. 1, the embodiment provides a biped robot capable of being spliced autonomously. The biped robot comprises a torso 3, arms, legs, a tolerance docking sleeve 10, and a torso docking device 11. The arms are correspondingly arranged at both sides of the torso 3, and two legs are arranged at the lower side of the torso. The tolerance docking sleeve 10 is movably arranged at the rear side of the torso 3 through a base 9, and the torso docking device 11 is fixed to the front side of the torso 3.

Figure 4:
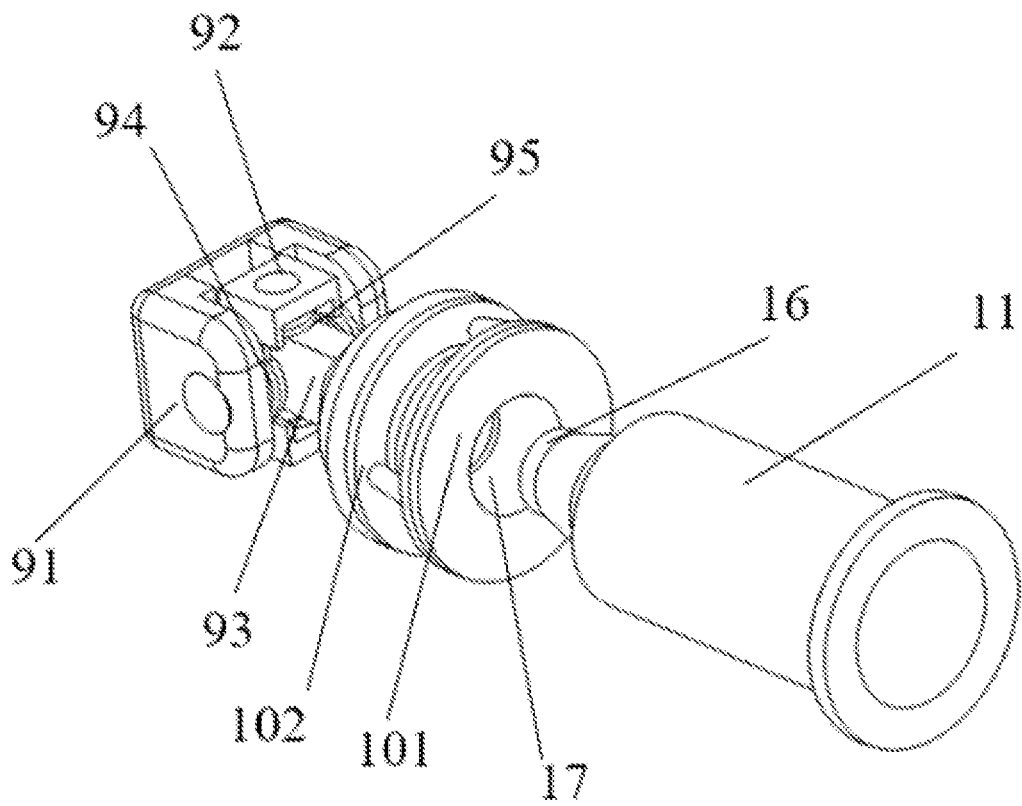
FIG. 4 is a schematic diagram of an active connection mechanism at a front/rear side of a torso of a robot according to the embodiment 1 of the present disclosure.

In this embodiment, as shown in FIG. 4, the base 9 comprises a base body 91, a pitching motion link 91, and a rolling motion link 93. The base body 91 is provided with a connecting space, and in the connecting space, the base body 91 is connected to the pitching motion link 92 by the pitching torsion spring 94, and the pitching motion link 92 is connected to the rolling motion link 93 by a rolling torsion spring 95. The tolerance docking sleeve 10 comprises a tolerance guide sleeve 102 connected to one end, away from the base 9, of the rolling motion link 93, a docking sleeve cap 101 connected to the tolerance guide sleeve 102, and an electromagnet 17 arranged in the tolerance guide sleeve 102, where the electromagnet is a controllable electromagnet. The tolerance guide sleeve 102 is provided with a conical accommodation space. One end, away from the torso 3, of the torso docking device 11 is provided to be conical, and the conical size corresponds to the size of the conical accommodation space of the tolerance guide sleeve 102. A docking iron sheet 16 is arranged at the top end of the torso docking device 11.

Specifically, active connection devices are arranged at the front side and the rear side of the torso 3 of the robot, the docking iron sheet 16 is arranged at the tail end of the cylindrical docking device 11 at the front side and configured to be connected to the electromagnet 17 in the connection device at the rear side in an adsorptive manner. The connection device at the rear side is composed of two parts, the first is a two-degree-of-freedom rotating base formed by vertically installing two torsion springs, then a tolerance docking sleeve is connected at the rear part of the base, and a controllable magnet is installed in the middle of the docking sleeve, and connection and separation of the front end and the rear end of the two robots are achieved by controlling on-off of a magnet power supply, and such mode in this embodiment is referred to as a "shaft-hub type splicing" approach.

Figure 2:
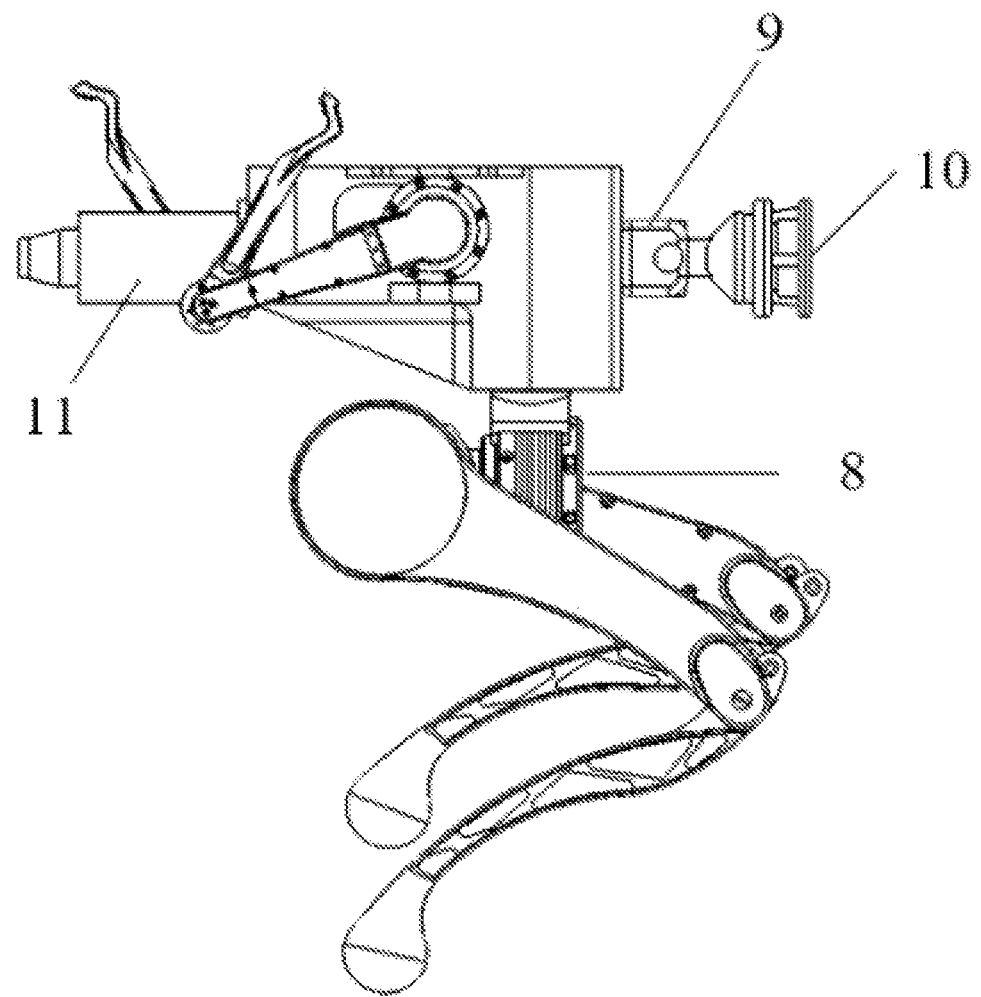
FIG. 2 is a schematic diagram of an overall structure of the side face of a modular biped robot capable of being spliced autonomously according to the embodiment 1 of the present disclosure.

In this embodiment, as shown in FIG. 1 and FIG. 2, each leg is provided with a thigh link 4 and a shank link 5. First leg rotating parts are correspondingly fixed to both ends of the lower side of the torso 3; second leg rotating parts are perpendicularly fixed to the first leg rotating parts, and are connected to the thigh links; third leg rotating parts are fixed to the thigh links, and are connected to the shank links. Preferably, the first leg rotating part, the second leg rotating part and the third leg rotating part are respectively arranged as a first leg motor, a second leg motor and a third leg motor.

Specifically, the first leg motor 8 is connected to the lower end of the torso 3 through a torso platform, the output end of the first leg motor 8 is connected to the second leg motor 6 by a connecting piece, the tail end of an output shaft of the second leg motor 6 is connected to the thigh link 4, the third leg motor 7 is fixed to the leg link 4, and is configured to drive a shank joint to move through the drive of the link.

Figure 3:
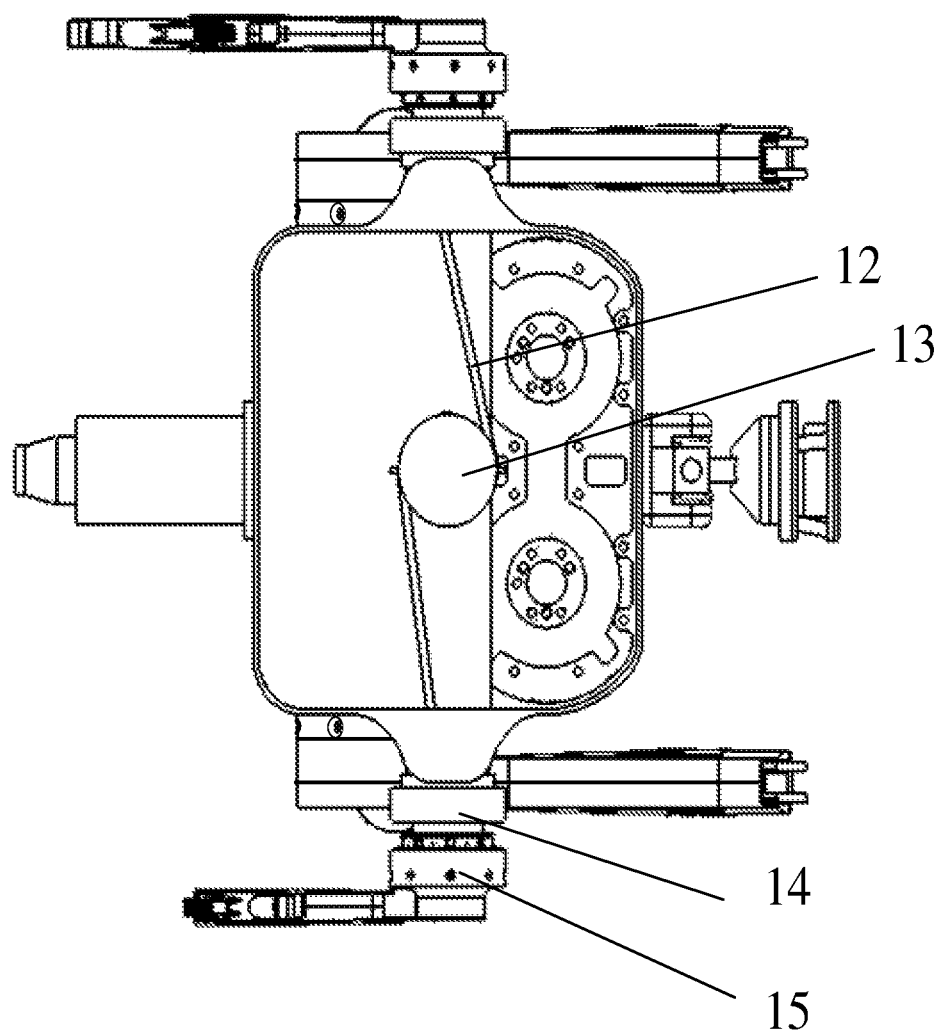
FIG. 3 is a schematic diagram of an overall structure of the top of a modular biped robot capable of being spliced autonomously according to the embodiment 1 of the present disclosure.
Figure 5:
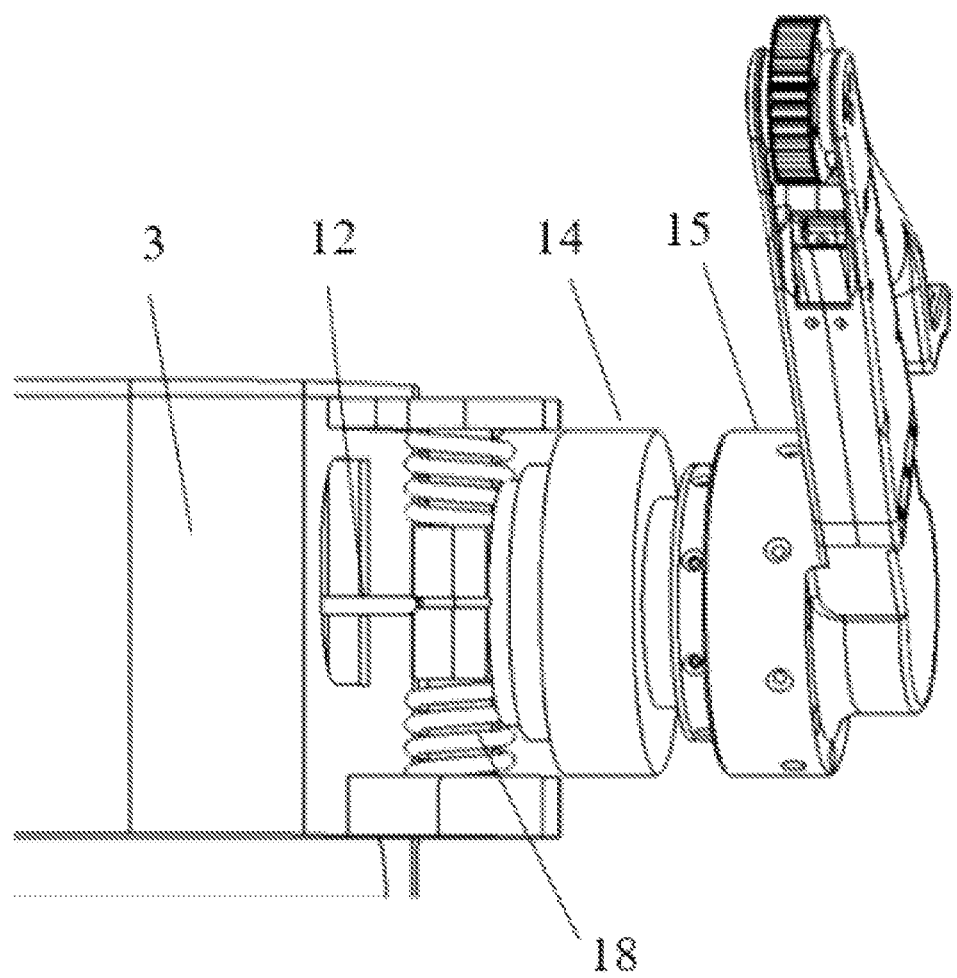
FIG. 5 is a schematic diagram of an arm rotating structure subjected to steel wire traction according to the embodiment 1 of the present disclosure.

In this embodiment, as shown in FIG. 3 and FIG. 5, each arm is provided with an upper arm link 2 and a forearm link 1. Upper arm rotating parts are respectively fixed to both sides of the torso 3 by steel wire traction torsion springs 18 and are connected to the upper arm links 2. Forearm rotating parts are fixed to the upper arm links 2 and are connected to the forearm links 1 through drive links. Preferably, the upper arm rotating part and the forearm rotating part are respectively arranged as an upper arm motor 14 and a forearm motor 15. An arm traction motor 13 is fixed inside the torso 3, a steel wire 12 is wound around an output shaft of the arm traction motor 13, and both ends of the steel wire 12 are fixed to the steel wire traction torsion springs 18 at both sides of the torso.

Specifically, the traction motor 13 drives the steel wire 12 to conduct traction so as to achieve opening-closing rotation of the arms through synchronous traction of the arms at both sides. The output end of the upper arm motor 14 is fixed to the upper arm link 2, the upper arm link 2 is fixedly connected to the forearm motor 15, the forearm motor 15 drives the forearm to rotate through the drive link, a controllable electromagnet is installed at the tail end of the forearm, and thus magnetic adsorptive connection and separation between the arms may be achieved by controlling on-off of a magnet power supply, such mode in this embodiment is referred to as a "handshake type splicing" approach.

To achieve the objective, in a second aspect, the present disclosure further provides a multi-configuration robot capable of being spliced autonomously. The multi-configuration robot comprises a plurality of biped robots capable of being spliced autonomously according to the first aspect, where two adjacent biped robots capable of being spliced autonomously are connected by the tolerance docking sleeve 10 and the torso docking device 11.

In accordance with this embodiment, a controllable electromagnet is installed at the tail end of the arm, and thus the arms of two adjacent biped robots capable of being spliced autonomously are connected by the controllable electromagnets.

Figure 6:
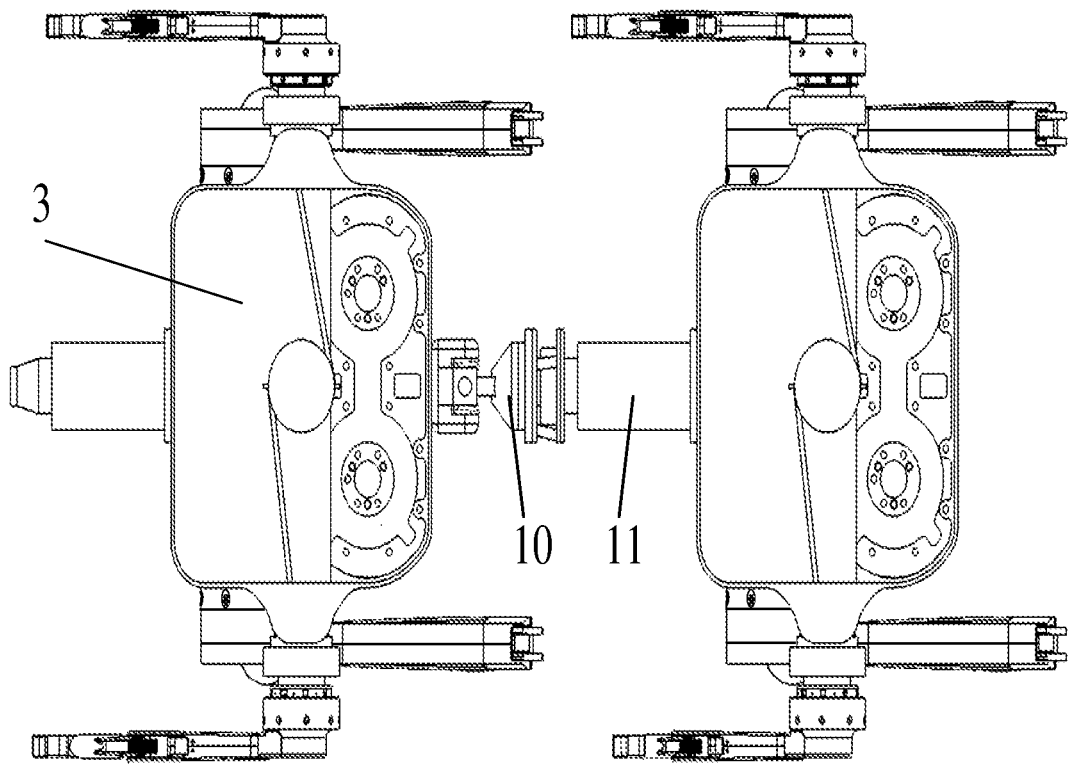
FIG. 6 is a top view of a quadruped robot formed by two robots according to embodiment 1 of the present disclosure by means of shaft-hub type splicing.
Figure 7:
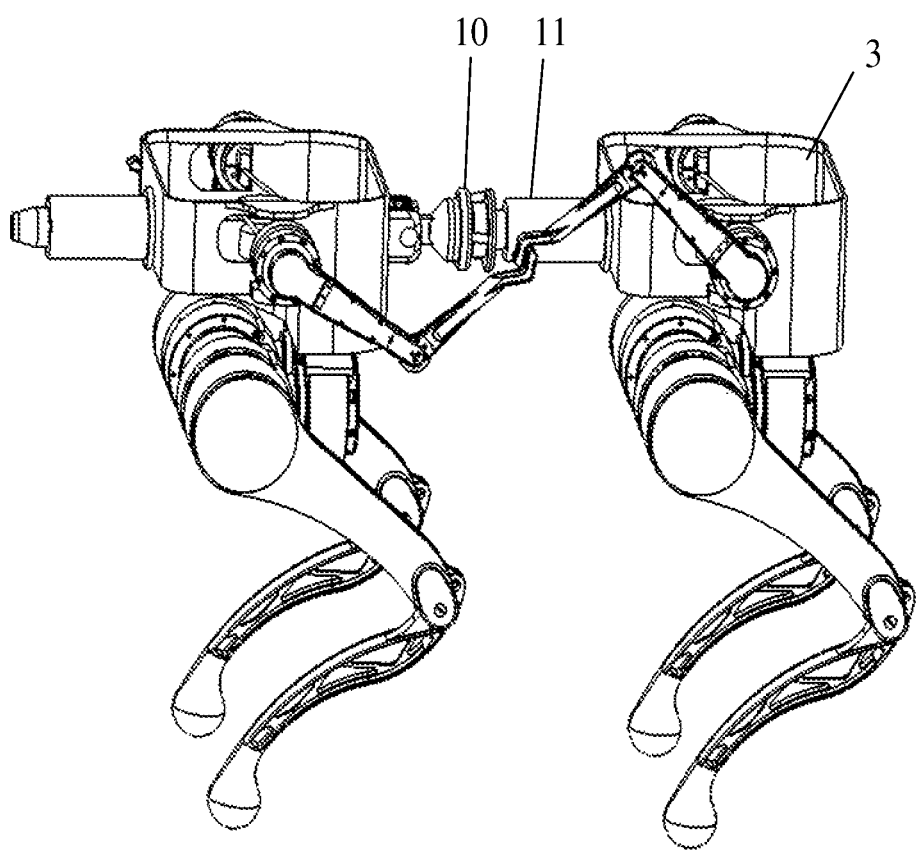
FIG. 7 is a schematic diagram of a quadruped robot formed by two robots according to embodiment 1 of the present disclosure by means of shaft-hub type splicing and handshake type splicing.
Figure 8:
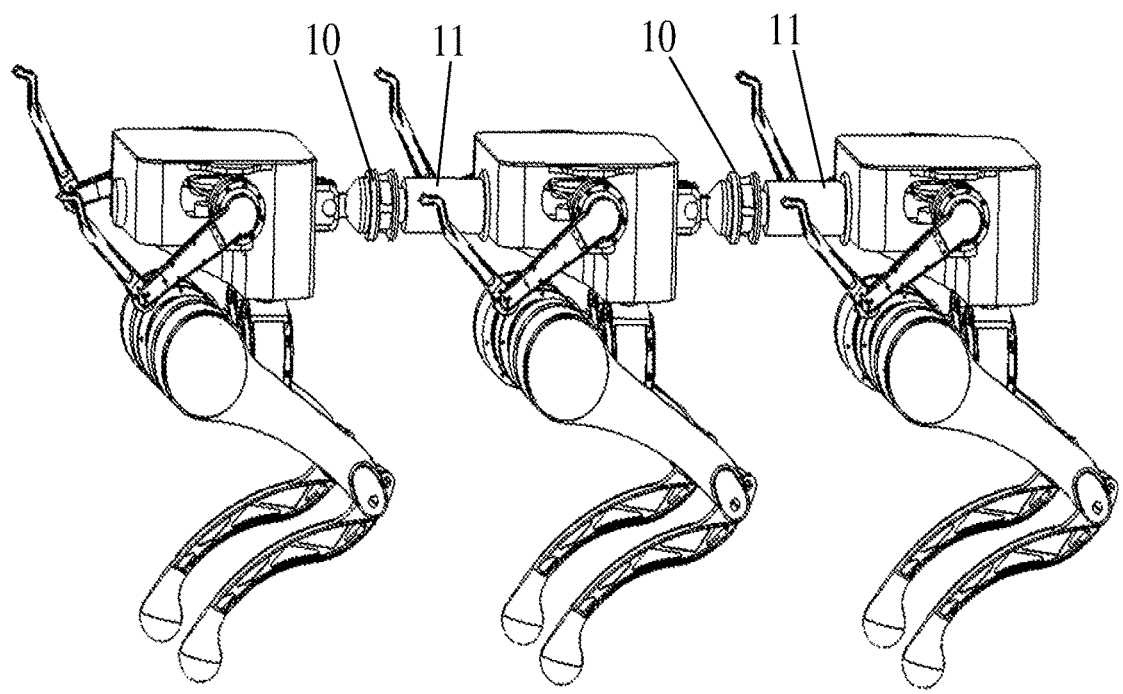
FIG. 8 is a schematic diagram of a hexapod robot formed by three robots according to embodiment 1 of the present disclosure by means of shaft-hub type splicing.
Figure 9:
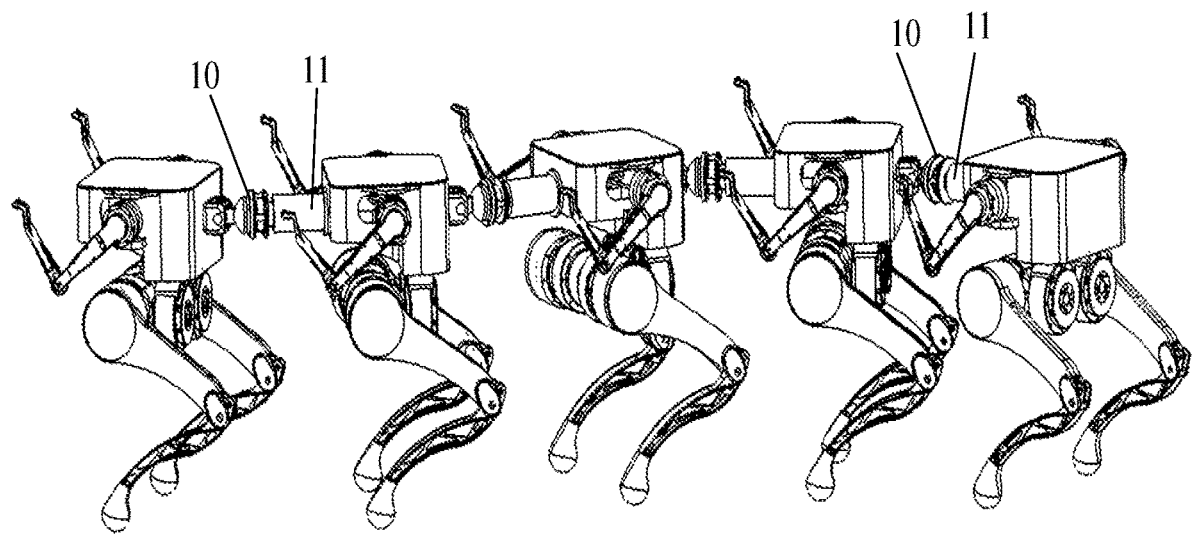
FIG. 9 is a schematic diagram of a combined robot formed by a plurality of robots according to embodiment 1 of the present disclosure by means of shaft-hub type splicing.

Specifically, the single robot may achieve independent gait motion, and the arm may achieve simple grabbing, pushing and other operations. Two single robots may be autonomously spliced into a quadruped robot by a middle docking mechanism. FIG. 6 is a top view of a quadruped robot formed by two robots by means of shaft-hub type splicing, and FIG. 7 is a schematic diagram of a quadruped robot formed by two robots by means of shaft-hub type splicing and handshake type splicing. Three robots may form a hexapod robot by splicing, FIG. 8 is a schematic diagram of a hexapod robot formed by three robots by means of shaft-hub type splicing, and by means of the shaft-hub type splicing, splicing combination of any number of robots may be achieved, and FIG. 9 is a schematic diagram of a combined robot formed by a plurality of robots by means of the shaft-hub type splicing. The combined robot has a plurality of arms to achieve large load operations such as grabbing, holding and supporting. When arm operation is not needed, the connection rigidity of the front robot and the rear robot may be enhanced by means of arm handshake type docking. The robots connected through the middle shaft-hub approach may achieve the relative motion of two passive degrees-of-freedom through the rotating base, and the robots connected through the arm handshake approach may achieve rigid/flexible relative movement of connection by means of the control of the arm motor. Through the splicing combination of a plurality of robots, the number of support legs for the robot is increased, such that the adaptability of the robot to the complex terrain is improved, and the robot has the capacity of large load operations under the complex terrains.

To achieve the objective, in a third aspect, the present disclosure further provides a control method of a multi-configuration robot capable of being spliced autonomously. The control method comprises the following steps:

energizing the electromagnet 17 in the tolerance guide sleeve 10, and inserting the torso docking device 11 into the conical accommodation space on the tolerance guide sleeve;

adsorbing, by the electromagnet 16 in the tolerance guide sleeve 10, the docking iron sheet 16 at the top end of the torso docking device 11, and enabling the conical accommodation space to be in fit with the conical structure on the torso docking device to achieve tolerance docking; and energizing the controllable electromagnets on the arms, and connecting, by the controllable electromagnet, the arms of the two adjacent biped robots capable of being spliced autonomously.

The foregoing is merely preferred embodiment of the present embodiment and is not intended to limit the present embodiment. For those skilled in the art, various modifications and variations may be made to the present embodiment. Any modifications, equivalent substitutions, improvements, etc. made within the spirit and principles of the present embodiment shall be included within the scope of protection of the present embodiment.

What is claimed is:

1. A biped robot capable of being spliced autonomously, comprising a torso, arms, legs, a tolerance docking sleeve, and a torso docking device;

the arms are correspondingly arranged on a left side and a right side of the torso, and two legs are arranged on a lower side of the torso;

the tolerance docking sleeve is movably arranged on a rear side of the torso through a base, and the torso docking device is fixed to a front side of the torso; and the base comprises a base body, a pitching motion link, and a rolling motion link; the base body is provided with a connecting space, and in the connecting space, the base body is connected to the pitching motion link by a pitch torsion spring, and the pitching motion link is connected to the rolling motion link by a rolling torsion spring.

2. The biped robot capable of being spliced autonomously according to claim 1, wherein the tolerance docking sleeve comprises a tolerance guide sleeve connected to one end, away from the base, of the rolling motion link, a docking sleeve cap connected to the tolerance guide sleeve, and an electromagnet arranged in the tolerance guide sleeve.

3. The biped robot capable of being spliced autonomously according to claim 2, wherein the tolerance guide sleeve is provided with a conical accommodation space, an end, away from the torso, of the torso docking device is provided to be conical, and a conical size corresponds to a size of the conical accommodation space of the tolerance guide sleeve; and a docking iron sheet is arranged at a top end of the torso docking device.

4. The biped robot capable of being spliced autonomously according to claim 1, wherein the legs each are provided with a thigh link and a shank link; first leg rotating parts are correspondingly fixed to two ends of the lower side of the torso, second leg rotating parts are perpendicularly fixed to the first leg rotating parts and are connected to the thigh links, and third leg rotating parts are fixed to the thigh links and are connected to the shank links by links.

5. The biped robot capable of being spliced autonomously according to claim 1, wherein the arms each are provided with an upper arm link and a forearm link; upper arm rotating parts are respectively fixed to both sides of the torso by steel wire traction torsion springs, and are connected to the upper arm links; and forearm rotating parts are fixed to the upper arm links, and the forearm rotating parts are connected to the forearm links by drive links.

6. The biped robot capable of being spliced autonomously according to claim 5, wherein an arm traction motor is fixed into the torso, a steel wire is wound around an output shaft of the arm traction motor, and both ends of the steel wire are fixed to the steel wire traction torsion springs on the both sides of the torso.

7. A multi-configuration robot capable of being spliced autonomously, comprising a plurality of biped robots capable of being spliced autonomously according to claim 1, wherein two adjacent biped robots capable of being spliced autonomously are connected by the tolerance docking sleeve and the torso docking device.

8. The multi-configuration robot capable of being spliced autonomously according to claim 7, wherein the tolerance docking sleeve comprises a tolerance guide sleeve connected to one end, away from the base, of the rolling motion link, a docking sleeve cap connected to the tolerance guide sleeve, and an electromagnet arranged in the tolerance guide sleeve.

9. The multi-configuration robot capable of being spliced autonomously according to claim 8, wherein the tolerance guide sleeve is provided with a conical accommodation space, an end, away from the torso, of the torso docking device is provided to be conical, and a conical size corresponds to a size of the conical accommodation space of the tolerance guide sleeve; and a docking iron sheet is arranged at a top end of the torso docking device.

10. The multi-configuration robot capable of being spliced autonomously according to claim 7, wherein the legs each are provided with a thigh link and a shank link; first leg rotating parts are correspondingly fixed to two ends of the lower side of the torso, second leg rotating parts are perpendicularly fixed to the first leg rotating parts and are connected to the thigh links, and third leg rotating parts are fixed to the thigh links and are connected to the shank links by links.

11. The multi-configuration robot capable of being spliced autonomously according to claim 7, wherein the arms each are provided with an upper arm link and a forearm link; upper arm rotating parts are respectively fixed to both sides of the torso by steel wire traction torsion springs, and are connected to the upper arm links; and forearm rotating parts are fixed to the upper arm links, and the forearm rotating parts are connected to the forearm links by drive links.

12. The multi-configuration robot capable of being spliced autonomously according to claim 11, wherein an arm traction motor is fixed into the torso, a steel wire is wound around an output shaft of the arm traction motor, and both ends of the steel wire are fixed to the steel wire traction torsion springs on the both sides of the torso.

13. The multi-configuration robot capable of being spliced autonomously according to claim 7, wherein a controllable electromagnet is installed at a tail end of the arm, and the arms of the two adjacent biped robots capable of being spliced autonomously are connected by controllable electromagnets.

14. The multi-configuration robot capable of being spliced autonomously according to claim 8, wherein a controllable electromagnet is installed at a tail end of the arm, and the arms of the two adjacent biped robots capable of being spliced autonomously are connected by the controllable electromagnets.

15. The multi-configuration robot capable of being spliced autonomously according to claim 9, wherein a controllable electromagnet is installed at a tail end of the arm, and the arms of the two adjacent biped robots capable of being spliced autonomously are connected by the controllable electromagnets.

16. A control method of the multi-configuration robot capable of being spliced autonomously according to claim 7, comprising the following steps:
    energizing the electromagnet in tolerance guide sleeve, and inserting the torso docking device into the conical accommodation space on the tolerance guide sleeve;
    adsorbing, by the electromagnet in the tolerance guide sleeve, the docking iron sheet at a top end of the torso docking device, and enabling the conical accommodation space to be in fit with the conical structure on the torso docking device to achieve tolerance docking; and
    energizing the controllable electromagnets on the arms, and connecting, by the controllable electromagnets, the arms of the two adjacent biped robots capable of being spliced autonomously.

17. The control method according to claim 16, wherein a controllable electromagnet is installed at a tail end of the arm, and the arms of the two adjacent biped robots capable of being spliced autonomously are connected by the controllable electromagnets.

* * * * *